US009580245B2

United States Patent

Mansfield et al.

(10) Patent No.: US 9,580,245 B2
(45) Date of Patent: Feb. 28, 2017

(54) ITEM-DETECTING OVERHEAD SENSOR FOR INVENTORY SYSTEM

(71) Applicant: Amazon Technologies, Inc., Reno, NV (US)

(72) Inventors: Peter K. Mansfield, Bellevue, WA (US); Ned Lecky, Vashon, WA (US); Peter R. Wurman, Acton, MA (US); Dennis Polic, Medford, MA (US); David Levy, Somerville, MA (US)

(73) Assignee: Amazon Technologies, Inc., Reno, NV (US)

( * ) Notice: Subject to any disclaimer, the term of this patent is extended or adjusted under 35 U.S.C. 154(b) by 165 days.

(21) Appl. No.: 14/301,135

(22) Filed: Jun. 10, 2014

(65) Prior Publication Data

US 2015/0353282 A1  Dec. 10, 2015

(51) Int. Cl.

| | |
|---|---|
| *G06F 7/00* | (2006.01) |
| *B65G 1/04* | (2006.01) |
| *G05D 1/00* | (2006.01) |
| *G06Q 10/00* | (2012.01) |
| *G06K 9/00* | (2006.01) |

(52) U.S. Cl.
CPC ............. *B65G 1/0492* (2013.01); *G05D 1/00* (2013.01); *G06K 9/00* (2013.01); *G06K 9/00664* (2013.01); *G06Q 10/00* (2013.01)

(58) Field of Classification Search
USPC ........................................................ 700/214
See application file for complete search history.

(56) References Cited

U.S. PATENT DOCUMENTS

| 3,886,413 | A | * | 5/1975 | Dow ........................ F16P 3/14 340/512 |
| 8,280,547 | B2 | | 10/2012 | D'Andrea et al. |
| 2007/0288123 | A1 | * | 12/2007 | D'Andrea ............... B66F 9/063 700/214 |
| 2008/0111704 | A1 | * | 5/2008 | Lieberman ............... B65G 1/02 340/686.1 |
| 2009/0135013 | A1 | * | 5/2009 | Kushida ................. G06Q 30/02 340/568.1 |
| 2012/0143427 | A1 | | 6/2012 | Hoffman et al. |

(Continued)

FOREIGN PATENT DOCUMENTS

| DE | 19508397 | 9/1996 |
| DE | 10113306 | 7/2002 |

(Continued)

OTHER PUBLICATIONS

U.S. Appl. No. 14/301,157, filed Jun. 10, 2014, Titled: Arm-Detecting Overhead Sensor for Inventory System.

(Continued)

*Primary Examiner* — Kyle Logan
(74) *Attorney, Agent, or Firm* — Kilpatrick Townsend & Stockton LLP

(57) ABSTRACT

Inventory systems may include one or more sensors capable of detecting spatial positioning of inventory holders and associated inventory items. Data can be received from a sensor, a boundary corresponding to a face of the inventory holder can be determined from the data, and items projecting across the boundary can be determined as items protruding from the inventory holder.

20 Claims, 13 Drawing Sheets

(56) References Cited

U.S. PATENT DOCUMENTS

2015/0006245 A1* 1/2015 Kuusisto ................ G06Q 30/02
705/7.29
2015/0139489 A1* 5/2015 Harada .................. G01B 11/00
382/103

FOREIGN PATENT DOCUMENTS

JP         2011072470       4/2011
WO      2013135968       9/2013

OTHER PUBLICATIONS

PCT/US2015/035176, "International Search Report and Written Opinion", Sep. 17, 2015, 12 pages.

* cited by examiner

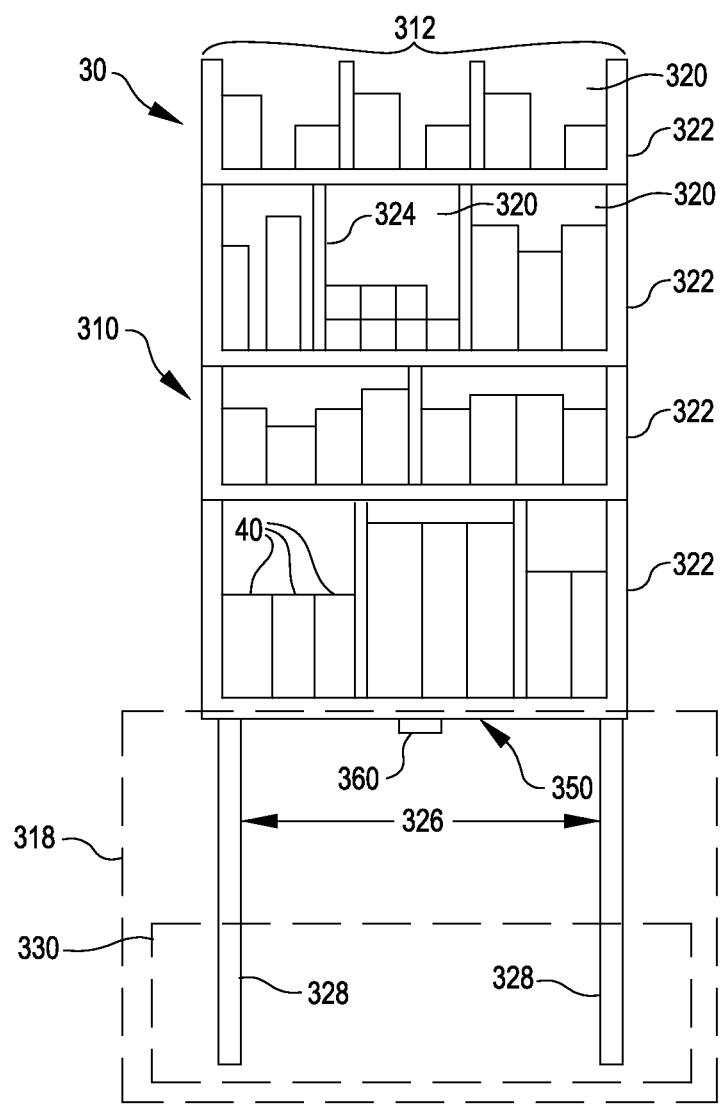

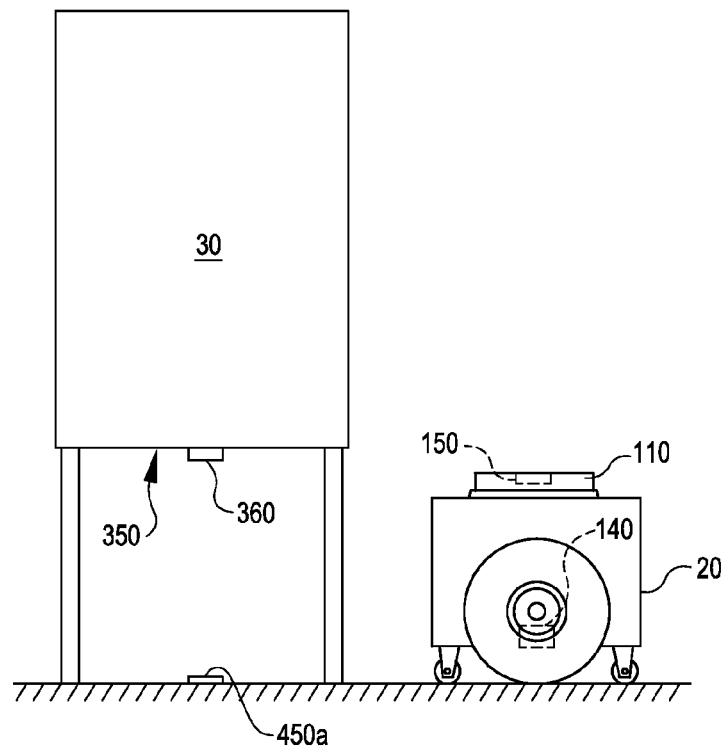
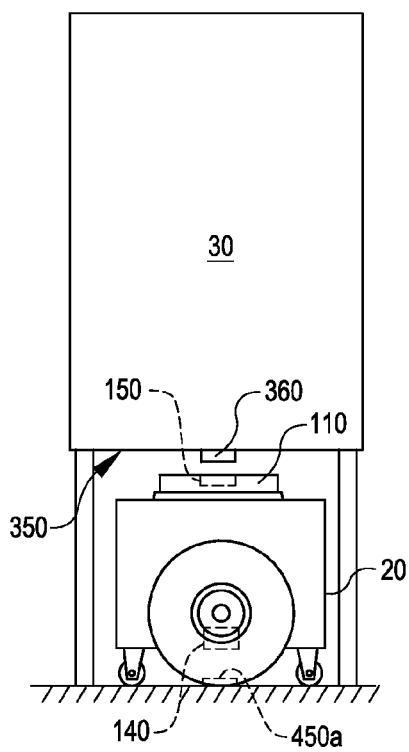
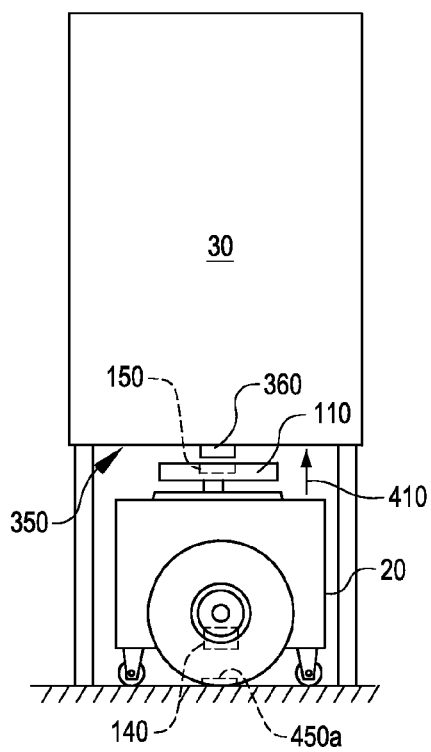

ITEM-DETECTING OVERHEAD SENSOR FOR INVENTORY SYSTEM

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which:

FIG. 5 illustrates in greater detail an example inventory holder that may be utilized in particular embodiments of the inventory system shown in FIG. 1;

FIGS. 6-11 show operation of various components of the mobile drive unit and the inventory holder during docking, movement and undocking;

DETAILED DESCRIPTION

Figure 1:
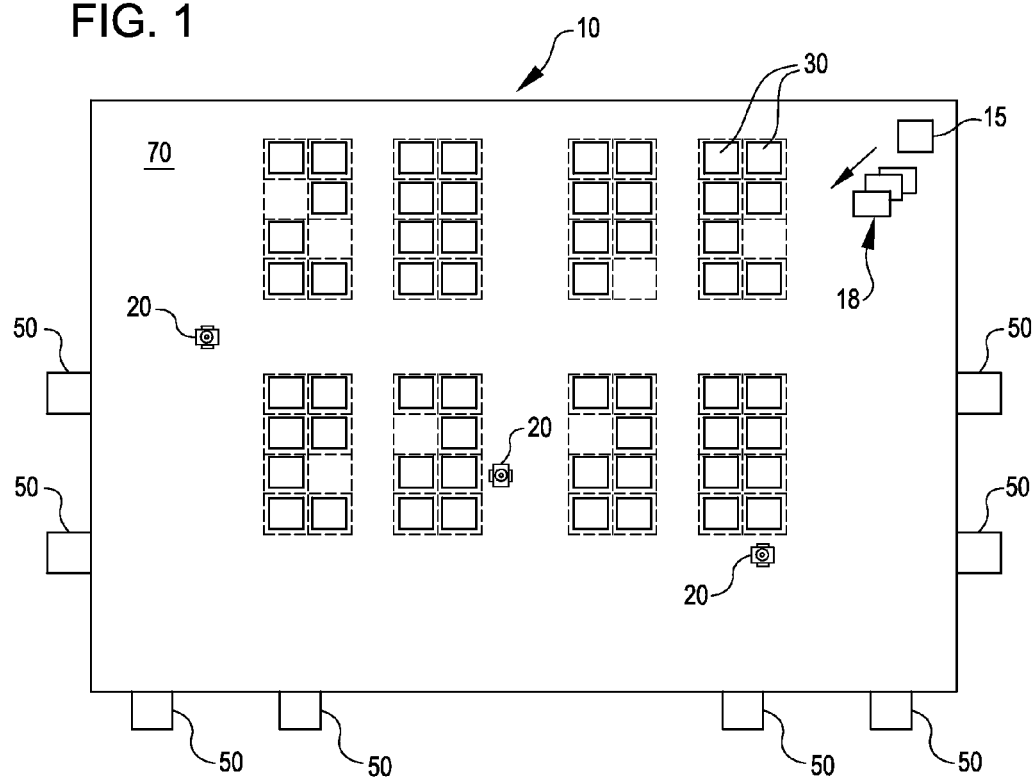
FIG. 1 illustrates components of an inventory system according to a particular embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and drive units for moving the inventory holders. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. Specifically, features herein are directed to detecting the position of objects relative to inventory holders so as to facilitate various functions of the inventory system. To this end, the inventory system can include sensors for collecting data about the spatial positions and/or relations of an inventory holder (or multiple inventory holders) and associated objects.

In accordance with an embodiment, an inventory station can include a sensor positioned above a receiving zone for an inventory holder. The sensor can be aimed at a downward and/or upward angle to provide a field of focus that includes a front face of an inventory holder positioned in the receiving zone. The sensor can collect data about the spatial position—such as distance from the sensor—of parts of the inventory holder, inventory items supported by the inventory holder, and other nearby objects in the field of focus. A computer processor can receive the data from the sensor and determine a plane corresponding to the front face of the inventory holder positioned in the receiving zone. The computer processor can compare the position of objects detected by the sensor with the position of the plane to determine which objects (if any) are protruding through the plane. The computer processor can cause details about any protruding object (such as position on the inventory holder) to be displayed so that an operator of the inventory station can identify and reposition any items that are overhanging an edge of the inventory holder, thereby reducing the risk of such items falling during movement of the inventory holder. Upon proper storage of the item, the computer processor may receive an indication that the item is no longer projecting over an edge and out of the inventory holder (such as from an "all-clear" button pressed by the operator and/or a subsequent scan and analysis indicating that no objects are protruding through the plane) and send a signal that the inventory holder is cleared for subsequent workflow actions.

In accordance with another embodiment, an inventory station can include an overhead or upwardly facing sensor aimed to detect arm placement of an operator. Data from the sensor can be communicated to a computer processor. The computer processor can identify data corresponding to the arm of the operator at a time of interest, such as when the arm crosses a plane associated with the front of the inventory holder or when a hand or other portion of the arm makes a particular gesture. The computer processor can use the sensor data to determine a height and a lateral position of the arm in a time window of interest. The computer processor can compare the height and the lateral position of the arm to a layout of an inventory holder to identify a bin on the inventory holder that corresponds to the arm position of the operator. The bin identification may be stored and associated with other information, such as to identify the bin location on the inventory holder at which the operator has stored or removed an inventory item.

FIG. 1 illustrates the contents of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 1 as a single, discrete component, management module 15 may represent multiple components and may represent or include portions of mobile drive units 20 or other elements of inventory system 10. As a result, any or all of the interaction between a particular mobile drive unit 20 and management module 15 that is described below may, in particular embodiments, represent peer-to-peer communication between that mobile drive unit 20 and one or more other mobile drive units 20. The contents and operation of an example embodiment of management module 15 are discussed further below with respect to FIG. 2.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The contents and operation of an example embodiment of a mobile drive unit 20 are discussed further below with respect to FIGS. 3 and 4.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 1 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 1 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 2:
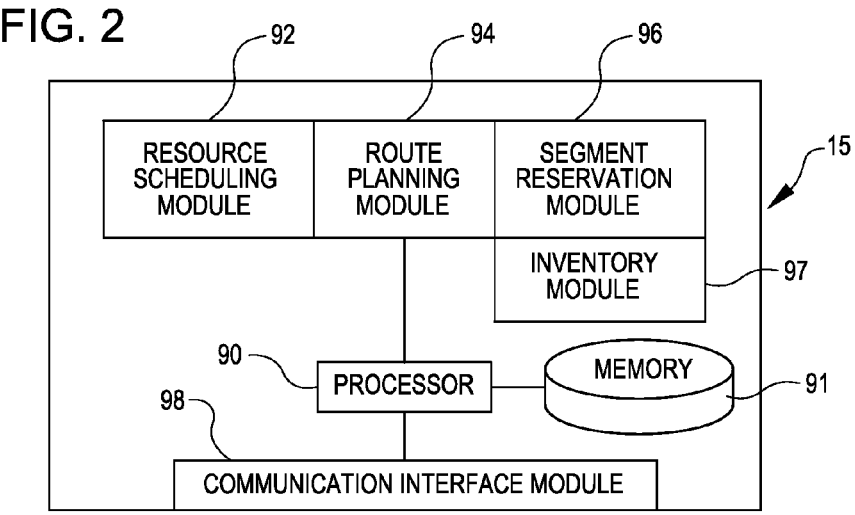
FIG. 2 illustrates in greater detail the components of an example management module that may be utilized in particular embodiments of the inventory system shown in FIG. 1.

FIG. 2 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10.

For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 3:
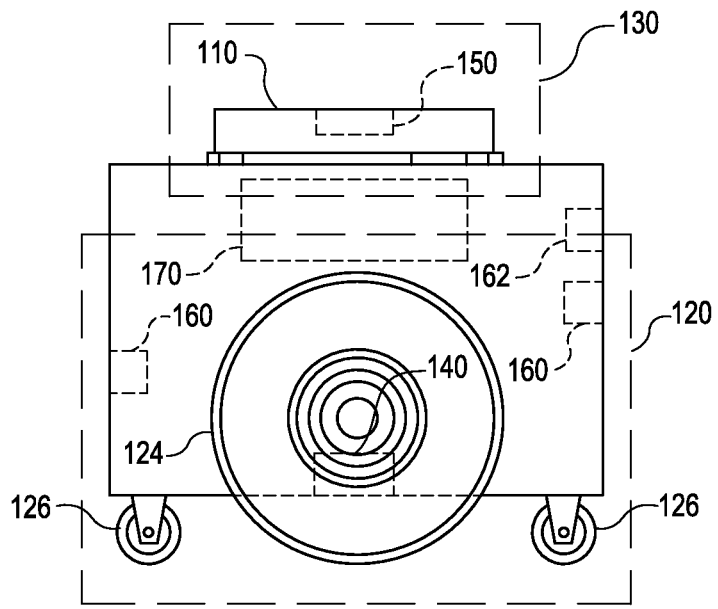
FIGS. 3 and 4 illustrate in greater detail an example mobile drive unit that may be utilized in particular embodiments of the inventory system shown in FIG. 1.
Figure 4:
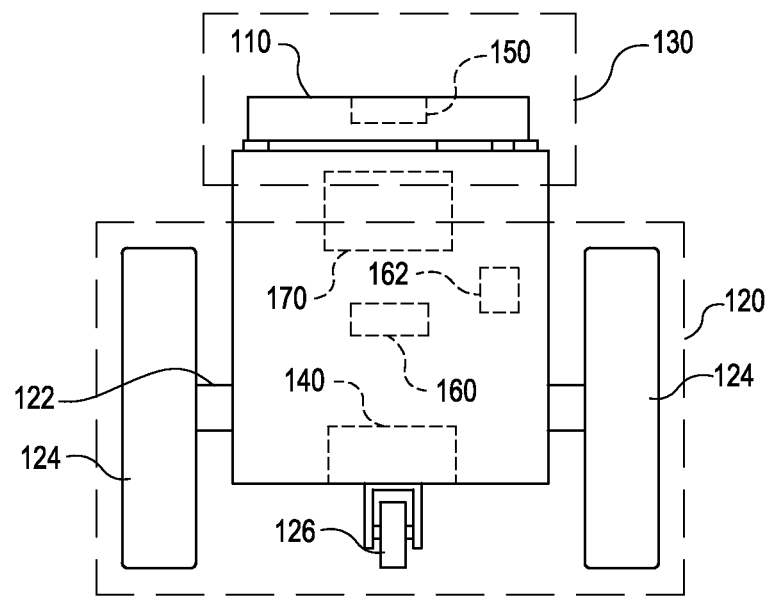

FIGS. 3 and 4 illustrate in greater detail the components of a particular embodiment of mobile drive unit 20. In particular, FIGS. 3 and 4 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel drive module 120. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speed from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 3 and 4 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

FIG. 5 illustrates in greater detail the components of a particular embodiment of inventory holder 30. In particular, FIG. 5 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include storage internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks 450. Mobile drive unit 20 may be configured to detect fiducial marks 450 and to determine the location of mobile drive unit 20 and/or measure its movement based on the detection of fiducial marks 450.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 40. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

FIGS. 6-11 illustrate operation of particular embodiments of mobile drive unit 20 and inventory holder 30 during docking, movement, and undocking.

FIG. 6 illustrates mobile drive unit 20 and inventory holder 30 prior to docking As noted above with respect to FIG. 1, mobile drive unit 20 may receive a command that identifies a location for a particular inventory holder 30. Mobile drive unit 20 may then move to the location specified in the command. Additionally, mobile drive unit 20 may utilize position sensor 140 to determine the location of mobile drive unit 20 to assist in navigating to the location of inventory holder 30.

In particular, FIG. 6 shows mobile drive unit 20 and inventory holder 30 as mobile drive unit 20 approaches the storage location identified by the received command. In the illustrated embodiment, the reference point is marked by fiducial mark 450A which comprises a surface operable to reflect light and which, as a result, can be detected by particular embodiments of position sensor 140 when mobile drive unit 20 is positioned over or approximately over fiducial mark 450A. As noted above, the illustrated embodiment of mobile drive unit 20 utilizes optical sensors, including a camera and appropriate image- and/or video processing components, to detect fiducial marks 450.

FIG. 7 illustrates mobile drive unit 20 and inventory holder 30 once mobile drive unit 20 reaches fiducial mark 450A. Because, in the illustrated example, fiducial mark 450A marks the location of the reference point to which mobile drive unit 20 is destined, mobile drive unit 20 begins the docking process once mobile drive unit 20 reaches fiducial mark 450A. In the illustrated example, mobile drive unit 20 is configured to dock with inventory holder 30 from a position beneath inventory holder 30 and, as a result, inventory holder 30 is stored so that docking surface 350 is located directly above fiducial mark 450A.

FIG. 8 illustrates operation of mobile drive unit 20 in docking with inventory holder 30. After positioning itself over fiducial mark 450A, mobile drive unit 20 begins the docking process. In the illustrated example, the docking process includes mobile drive unit 20 raising docking head 110 towards docking surface 350, as indicated by arrow 410. Additionally, in the illustrated example, mobile drive unit 20 and inventory holder 30 are configured so that mobile drive unit 20 lifts inventory holder 30 off the ground when mobile drive unit 20 docks with inventory holder 30 and, as a result, mobile drive unit 20 supports the weight of inventory holder 30 while mobile drive unit 20 is docked to inventory holder 30.

Figure 9:
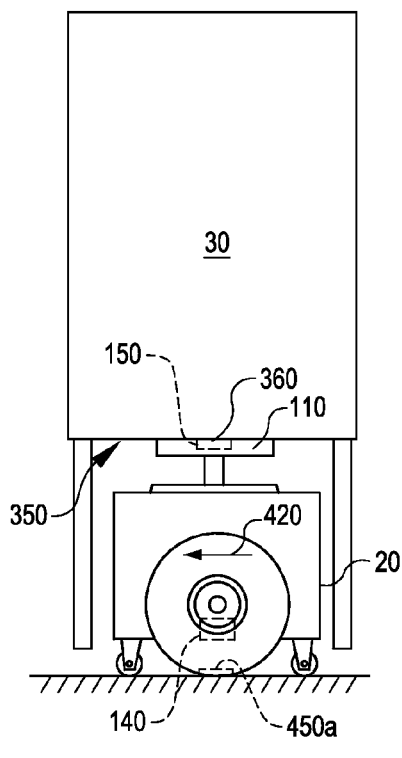

FIG. 9 illustrates operation of mobile drive unit 20 after docking with inventory holder 30. Mobile drive unit 20 is capable of inducing translational and/or rotational movement in inventory holder 30 while mobile drive unit 20 is docked with inventory holder 30. For example, in the illustrated embodiment, inventory holder 30 is supported by mobile drive unit 20 while the two components are docked and mobile drive unit 20 is capable of inducing translational and/or rotational movement in inventory holder 30 by moving or rotating itself or some sub-component of itself, such as docking head 110. As a result, while mobile drive unit 20 and inventory holder 30 are docked mobile drive unit 20 may move inventory holder 30 to a requested destination based on commands received by mobile drive unit 20, as suggested by arrow 420.

Once mobile drive unit 20 and inventory holder 30 arrive at the destination, mobile drive unit 20 may additionally rotate inventory holder 30 to present a particular face of inventory holder 30 to a packer or otherwise maneuver inventory holder 30 to allow access to inventory items 40 stored by inventory holder 30. Mobile drive unit 20 may then undock from inventory holder 30, as described below, or move inventory holder to another destination. For example, mobile drive unit 20 may move inventory holder 30 to a packing station where a packer can select appropriate inventory items 40 from inventory holder 30. Mobile drive unit 20 may then return inventory holder 30 to its original location or another location appropriate for undocking, such as a new storage location reserved for inventory holder 30.

Figure 10:
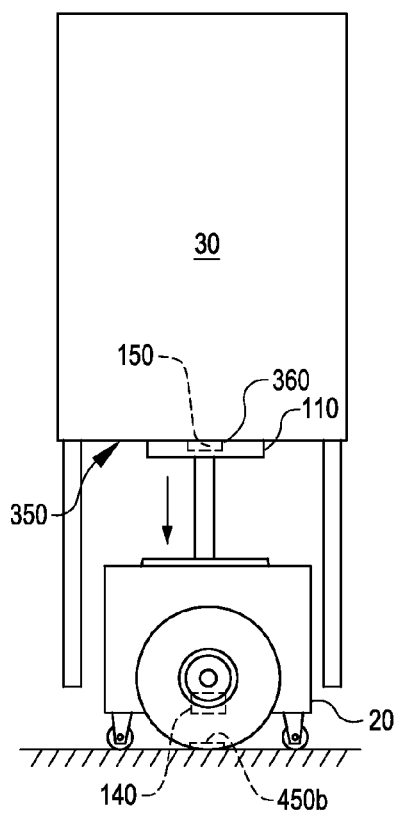

FIG. 10 illustrates mobile drive unit 20 and inventory holder 30 when the two components arrive at an appropriate point for undocking As noted above, this may represent a final destination specified by the original command, the original storage location for inventory holder 30, or any other point within the workspace. At or near the destination, mobile drive unit 20 may detect another fiducial mark 450, fiducial mark 450B, associated with the undocking location. Mobile drive unit 20 determines its location based on fiducial mark 450B and, as a result, determines that it has reached the undocking location. After determining that it has reached the undocking location, mobile drive unit 20 initiates an appropriate undocking process based on the configuration and characteristics of mobile drive unit 20 and inventory holder 30.

Figure 11:
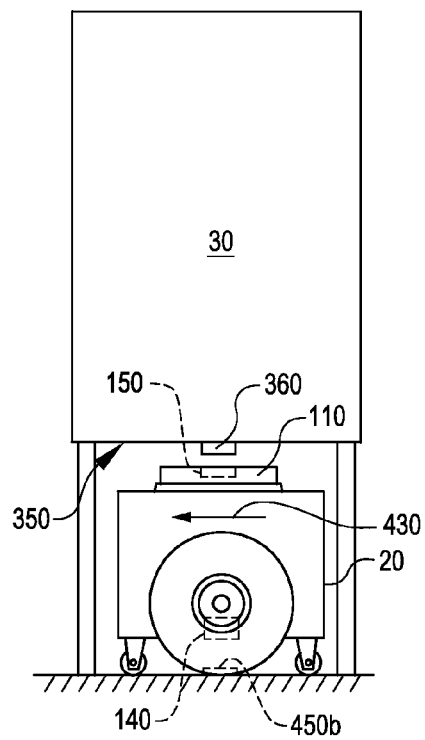

FIG. 11 illustrates a mobile drive unit 20 and inventory holder 30 subsequent to undocking Mobile drive unit 20 may then move away from inventory holder 30, as suggested by arrow 430, and begin responding to other commands received by mobile drive unit 20.

As described above, embodiments herein are directed to detecting the position of objects relative to inventory holders 30. In some embodiments, sensors can be used to collect data for determining whether any inventory items 40 are overhanging a boundary of an inventory holder 30. In further embodiments, sensors additionally or alternatively can be used to collect data for determining the position of a worker's limb relative to an inventory holder 30.

Figure 12:
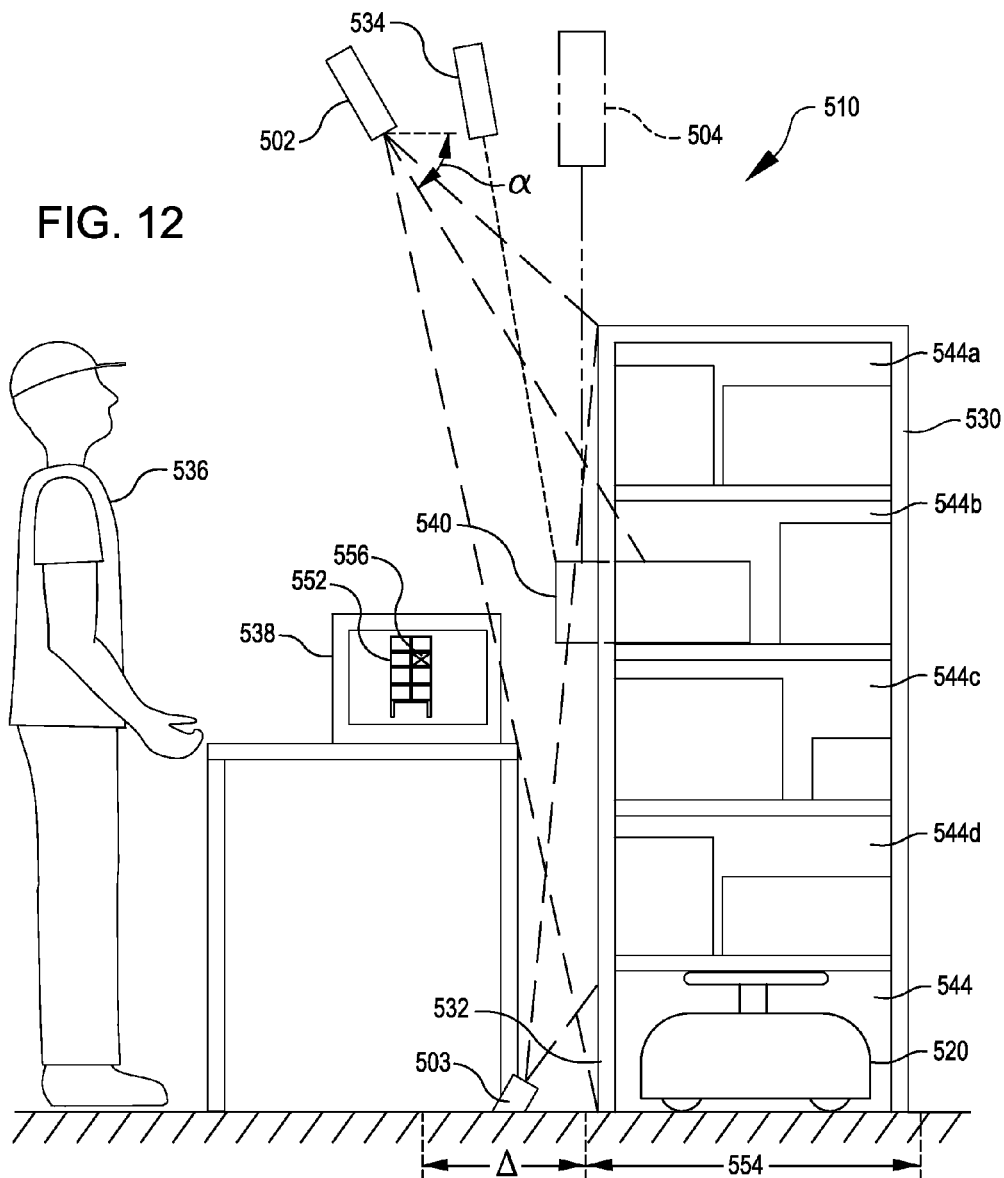
FIG. 12 illustrates a side view of an inventory holder and an overhead sensor in accordance with embodiments.

FIG. 12 illustrates an embodiment of an inventory system 510 that includes a sensor 502 positioned above an inventory holder 530. The sensor 502 can be positioned so as to view or detect a front face 532 of the inventory holder 530. The sensor 502 may also detect inventory items—such as inventory item 540—supported or stored within various inventory bins 544a-d on the inventory holder 530. Data from the sensor 502 can be used to determine if any inventory item 540 is extending past the front face 532 of the inventory holder 530 in a variety of different ways, some of which are described in greater detail with respect to FIGS. 13-17. Upon detection of an overhanging inventory item 540, the inventory system 510 can alert an operator 536. For example, the inventory system 510 can cause a laser pointer 534 to indicate the position of the overhanging inventory item 540 by shining a light at the position of the item 540. As another example, the inventory system 510 can alternatively or additionally provide a representation or caricature 552 of the inventory holder 530 on a display 538 so that the operator 536 can see an indicator 556 of the position of the overhanging item 540. The inventory system 510 may instruct a mobile drive unit 520 to refrain from moving the inventory holder 530 until the overhanging condition of the item 540 has been resolved (e.g., is no longer detected by the data from the sensor 502 or is indicated as resolved by input—such pressing a button—from the operator 536).

The sensor 502 can be positioned at any suitable angle and offset position relative to the inventory holder 530. For example, as depicted in FIG. 12, the sensor 502 can be positioned at an angle $\alpha$ of approximately 60 degrees down from horizontal and at an offset position $\Delta$ of 0.75 meters from a receiving zone 554 for the inventory holder 530.

However, other orientations are also possible, and the angle α and/or offset Δ of the sensor 502 from the inventory holder 530 may be adjusted to improve a depth of field and/or data resolution of the sensor 502 and/or decrease a likelihood that the operator 536 or other objects will obstruct the view of the sensor 502 toward the inventory holder 530. In some arrangements, the sensor 502 can even be arranged at an alternate position 504 directly overhead a front face 532 of the inventory holder 530. In some embodiments, one or more additional sensors 503 can be provided below the inventory holder 530 so as to supplement data from the sensor 502. Other arrangements are also possible, including positioning the sensor 502 and/or 503 at other locations relative to the inventory holder 530 (e.g., below, beside, in front, off to a side, or on the inventory holder 530) or mounting the sensor 502 on an operator 536 or other movable frame of reference.

The sensor 502 may be a three-dimensional camera. Whereas a photographic camera may capture an image showing the color or brightness of objects within view, a three dimensional camera may capture information about distances to objects within view. A spatial position of an object relative to the sensor 502 can be determined based on the detected distance to the object and the placement of the object within the view. For example, the object's location in a view at a certain width from a vertical centerline and at a certain length from a horizontal centerline can be combined with the distance to the object to determine coordinates for the object relative to the sensor 502. The position and orientation of the sensor 502 relative to any other frame of reference can be used to convert the spatial position of the object to be relative to the other frame of reference. For example, the position of an object relative to the sensor 502, the inventory holder 530, and/or the receiving zone 554 may be determined based on data collected by the sensor 502. Various three-dimensional cameras are commercially available, including the SoftKinetic DepthSense DS311 Camera utilized in testing various embodiments described herein. Some three-dimensional cameras (including the DS311) can additionally capture brightness or color information, which can be correlated to the captured distance information to provide both distance and color information of viewed objects. However, the sensor 502 may additionally or alternatively be or include any other suitable sensor or sensors capable of obtaining any form of data indicative of a location or spatial position of an object. For example, the sensor 502 may include one or more two-dimensional cameras configured to capture one or more two-dimensional images that may be analyzed and/or processed to provide a spatial representation of an object within a particular space. Further non-limiting examples of sensors that may be suitable include stereo cameras and stereo vision three-dimensional sensors.

Figure 13:
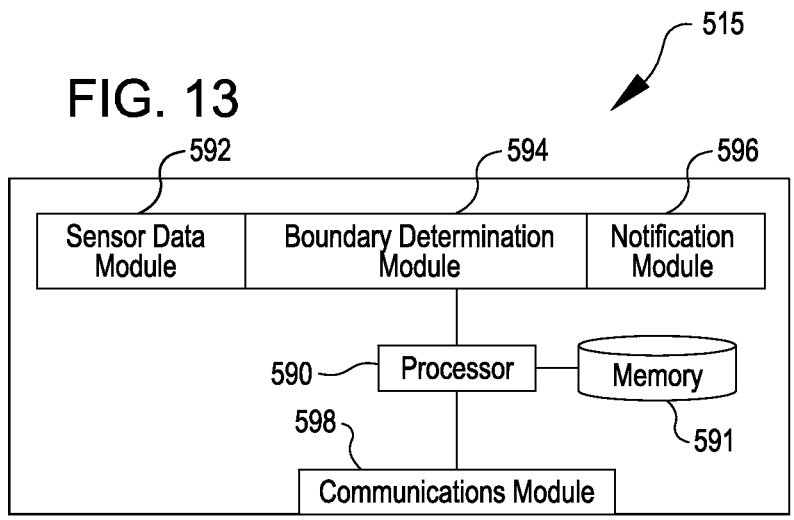
FIG. 13 illustrates an example module that may be utilized in particular embodiments of the inventory system shown in FIG. 12.

FIG. 13 illustrates an overhang module 515 that can be used to provide functions described with respect to FIG. 12 and elsewhere herein. The overhang module 515 can include a sensor data module 592, a boundary determination module 594, a notification module 596, and a communications module 598. These modules may be associated with a processor 590 and memory 591. The communications module 598 can allow the overhang module 515 to communicate with other components of the inventory system 510. In some aspects, modules or components of the overhang module 515 can be the same or otherwise linked to modules or components described elsewhere herein. For example, the processor 590 may be the same or a different processor as the processor 90 described with respect to FIG. 2. In some aspects, the overhang module 515 may be a subcomponent or otherwise associated with one of the modules described with respect to FIG. 2 (e.g., the inventory module 97).

Although the overhang module 515 is described herein with respect to components depicted in FIG. 12, the features of the overhang module 515 can also be used with other systems and components described herein. The sensor data module 592 can receive, process, and/or relay information from the sensor 502. For example, the sensor data module 592 can compile, filter, and/or interpret the data from the sensor 502. The boundary determination module 594 can use data about the inventory holder 530 (such as the data from the sensor data module 592 and/or data accessed from the resource scheduling module 92 about the inventory holder 530) to determine a boundary (such as an edge) corresponding to a face of the inventory holder 530. The boundary determination module 594 can process information about a boundary of an inventory holder 530, such as a location of the boundary and/or whether other detected objects are in front or behind the boundary. A notification module 596 can provide information to an operator 536 or another component of the inventory system 510, e.g., to provide an opportunity to remedy any issues related to the boundary determination or overhanging items. The communications module 598 can interface with other modules within the overhang module 515 and components in other parts of the inventory system 510 such as the sensor 502 or the display 538.

Figure 14:
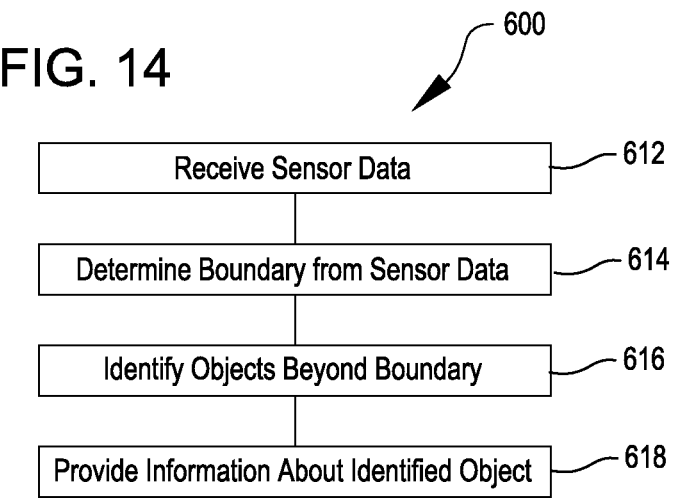
FIG. 14 is a flowchart representing a process that can be executed by a system for detecting overhanging inventory items in accordance with embodiments.

FIG. 14 illustrates an example of a process 600 for detecting protruding inventory items that can be executed by the overhang module 515, such as in the inventory system 510. Some or all of the process 600 (or any other processes described herein, or variations and/or combinations thereof) may be performed under the control of one or more computer systems configured with executable instructions, such as the modules described herein, and may be implemented as code (e.g., executable instructions, one or more computer programs or one or more applications) executing collectively on one or more processors, by hardware or combinations thereof. The code may be stored on a computer-readable storage medium, for example, in the form of a computer program including a plurality of instructions executable by one or more processors. The computer-readable storage medium may be non-transitory. Moreover, unless indicated otherwise, acts shown in the processes are not necessarily performed in the order shown, and/or some acts can be omitted in embodiments.

At operation 612, the sensor data module 592 can receive data from the sensor 502, such as by the communications module 598. The sensor data module 592 can filter the data such as by removing data that is not of interest (e.g., outside a volume of interest). At operation 614, the boundary determination module 594 can determine a boundary (such as an edge) of an inventory holder 530 based on the data received from the sensor 502 and processed by the sensor data module 592. At operation 616, the boundary determination module 594 can identify objects that are at least partially beyond the boundary determined in operation 614. In operation 618, the notification module 596 can provide information about the objects identified in operation 616 as being beyond the identified boundary.

Figure 15:
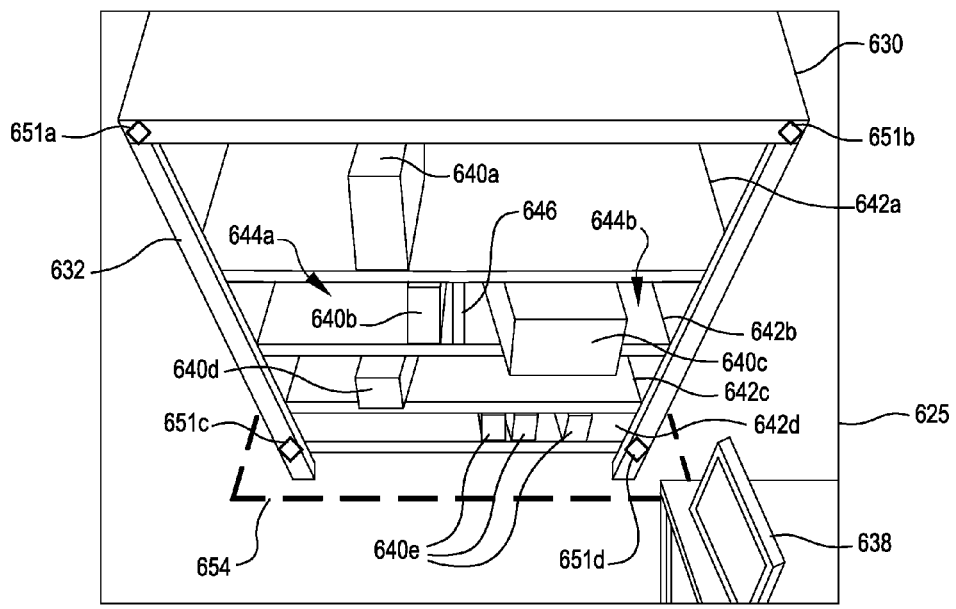
FIG. 15 illustrates a view from an overhead sensor of an inventory holder in accordance with embodiments.
Figure 16:
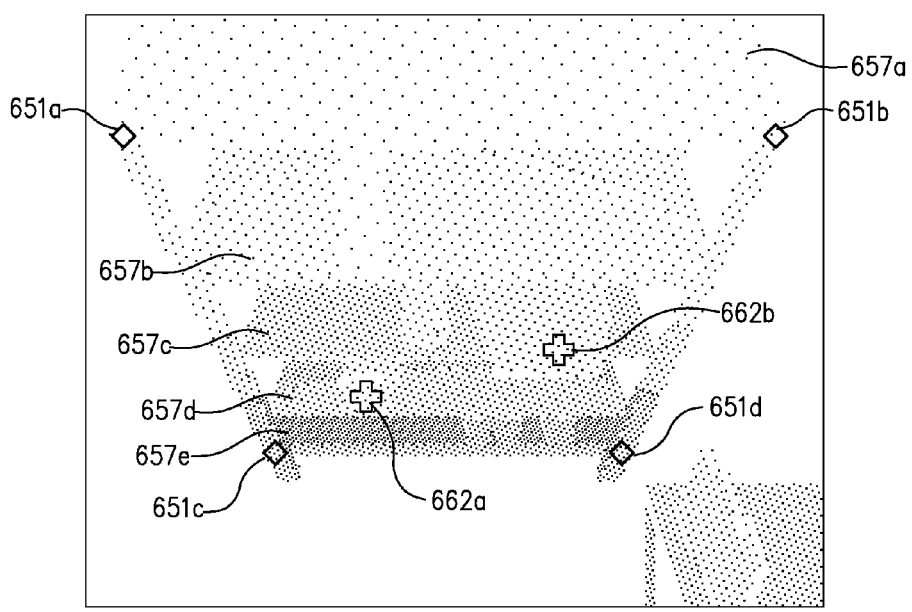
FIG. 16 illustrates a three-dimensional representation of an inventory holder provided by an overhead sensor in accordance with embodiments.
Figure 17:
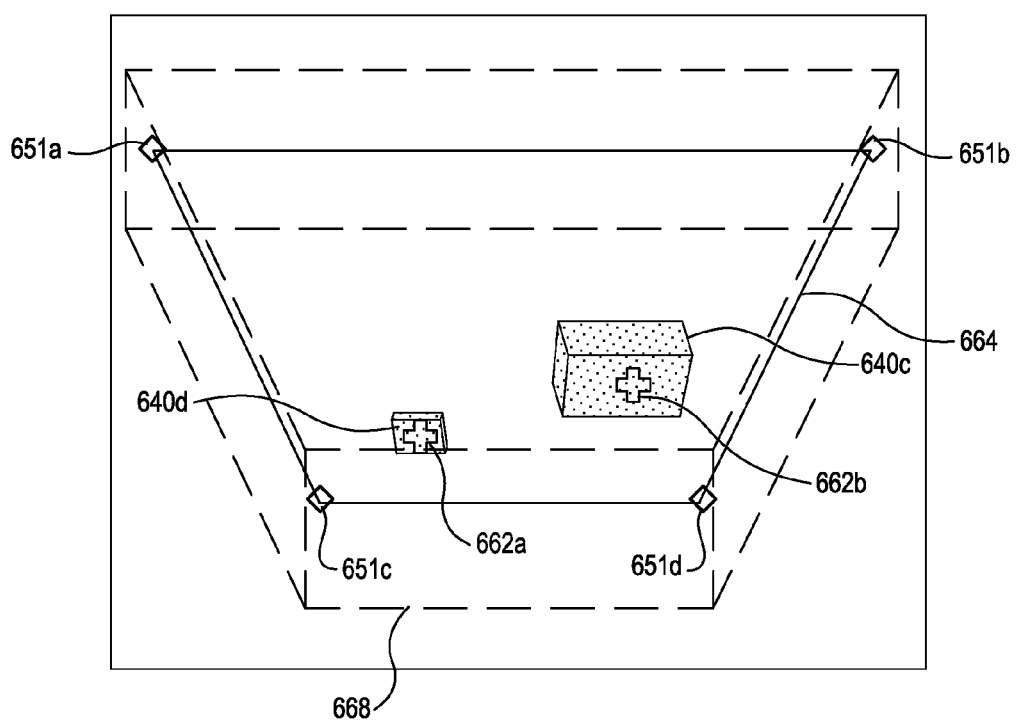
FIG. 17 illustrates an example of a plane used to identify items protruding from a front face of an inventory holder in accordance with embodiments.

Portions of the process 600 may be further understood with reference to examples described in FIGS. 15-17. FIG. 15 illustrates an example of a view 625 from an overhead sensor, such as sensor 502 depicted in FIG. 12. The view 625 can be aimed at a receiving zone 654. The receiving zone 654 may be an area in which an inventory holder 630 is expected to be placed for operations involving the inventory holder 630. The inventory holder 630 may include a number of shelves 642*a-d* which may be subdivided into inventory bins such as inventory bin 644A and 644B, which are separated by an adjustable divider 646. A variety of inventory items 640*a-e* can be supported by the inventory holder 630. One or more of the inventory items 640*a-e* may project past a front face 632 of the inventory holder 630. For example, as depicted in FIG. 15, inventory item 640*c* can be seen projecting a significant amount past the front face 632, while an inventory item 640*d* can be seen projecting from the front face 632 by a lesser amount. The inventory holder 630 may also include fiducial marks 651*a-d* on the front face 632. The view 625 may also include other nearby objects apart from the inventory holder 630, such as a display 638 associated with or positioned near the receiving zone 654.

FIG. 16 illustrates distance information gathered from the sensor 502 by the view 625 depicted in FIG. 15. For example, the sensor 502 may obtain distance information which indicates the distance from the sensor 502 to objects within the view 625. In FIG. 16, distances are rendered as different shades 657*a*-657*e*. For example, each different shade 657*a*-657*e* may represent different ranges of distances. Although FIG. 16 depicts the distance information in this manner, the distance information from the sensor 502 can be stored and processed in any suitable manner, including as a collection of datapoints, each indicating a position in three dimensional space. These datapoints can be used to determine a distance between the sensor 502 and an associated object within the view 625. Furthermore, although the distances in FIG. 16 are depicted in groupings of like ranges, each datapoint may include a discrete value instead of being associated with a range.

The distances between the sensor 502 and the position within the view 625 can be converted to calculate a three dimensional position of all of the objects within the view 625 relative to any suitable frame of reference. For example, the objects within the view 625 may be mapped to a physical position relative to the sensor 502, the inventory holder 530, or the workstation containing the receiving zone 654. In the depicted example, the fiducial marks 651*a*-651*d* may be identified and each associated with a distance from the sensor 502.

As illustrated in FIG. 17, data from the sensor 502 can be processed to identify protruding objects 640*c* and 640*d*. To reduce an amount of data to be processed, the sensor data module 592 may eliminate data corresponding to objects positioned outside of a volume of interest. As an illustrative example, the sensor data module 592 may eliminate data outside of a volume of interest 668 that corresponds to a region around a nominal face (i.e., an expected position of the front face 532) of the inventory holder 630, such as a rectangular volume projecting 100 mm forward and 150 mm backward from the nominal face and extending 75 mm beyond either lateral side of the nominal face. As an alternate illustrative example, the volume of interest 668 may be a volume determined in relation to the detected position of the fiducial marks 651*a-d*. As may be appreciated from FIG. 17, eliminating data from outside of the volume of interest 668 may eliminate the distance information corresponding to objects such as the display 638 seen in the view 625 in FIGS. 15 and 16.

The sensor data module 592 can determine a boundary 664 corresponding to the inventory holder 630. For example, the boundary 664 may be a plane. As an illustrative example, the plane may be calculated based on the position of the fiducial marks 651*a-d*. The plane may intersect the positions of the fiducial marks 651*a-d* or be offset forward by a certain amount. Other ways of determining the plane are also possible, including some that will be described subsequently. The boundary 664 may correspond to an edge of the inventory holder 630.

Based on the position of the boundary 664, the sensor data module 592 may eliminate all data corresponding to objects positioned behind the boundary 664. The boundary determination module 594 can identify clusters of datapoints corresponding to objects (such as 640*c* and 640*d*) positioned directly in front of the boundary 664 and within the volume of interest 668. The boundary determination module 594 may mark the location of such objects such as is depicted by the identifier marks 662*a* and 662*b*. The location of any marked objects can be communicated to an operator 536 via a laser pointer 534 or display 538 as described with respect to FIG. 12.

In some embodiments, the boundary determination module 594 may calculate the physical size of the protruding portion of the overhanging item (such as 640*c* and 640*d*) based on a size and distance of the associated cluster of datapoints. The boundary determination module 594 may include a threshold size below which the item is not called to the operator's attention. In an illustrative example, the threshold could be set so that the item 640*c* (protruding a great degree) is identified for the operator 536, while the item 640*d* (protruding a potentially insignificant degree) would not be identified for the operator 536.

In some embodiments, the boundary 664 can be determined without the use of fiducial marks 651*a-d*. In an illustrative example, a plane-fit process involves grouping datapoints according to a grid and using a weighted least-squares approach to iterate the plane fit. The illustrative process utilizes a number of acts. Data from the sensor is transformed so that the spatial position of each datapoint is provided in station coordinates (e.g., similar to a point of view of the operator 536 in FIG. 12 and specifically, for the sake of illustration, having an origin beneath the inventory holder 530, an x-direction being the operator's "right", a y-direction being the operator's "up", and a z-direction being the operator's "backward"). A grid or array of cells (e.g., a 10×20 cell configuration) is defined across the X-Y plane (i.e., the plane facing the operator 536) over the volume of interest 668. Datapoints are sorted into whichever X-Y cell corresponds to the X-Y coordinates of the datapoint. Within each X-Y cell, the datapoints are sub-divided into increments along the Z-axis (e.g., into one-millimeter wide bins). Within each X-Y cell and moving along the Z-axis away from the operator 536, each bin is assigned a cumulative value indicating the sum of the number of points in the previous bins plus the number of points in that bin. The Z-depth of the first bin to exceed an assigned threshold of cumulative value is assigned to the X-Y cell. Cell Z-depths thus provide an approximation of the depth at which enough datapoints have been detected in a cell to indicate that a front edge of detected objects in the cell has been found. (Additionally, determining a front edge by using a threshold (even a threshold as low as 2) can reduce the effect of random noise and eliminate cells with very few points from consideration during the plane fit calculation.) Accordingly, a plane fit to the set of cell Z-depths can approximate the front edge of the inventory holder 630. The plane can be fit to the set of cell Z-depths by any method of fitting a plane to a set of points in three-dimensional space, including an iterated weighted least-squares approach relative to a nominal face of the inventory holder 630.

Although the preceding discussion focuses primarily on the boundary 664 being a plane, other types of boundaries 664 and/or accompanying processes of identifying protruding objects 640 are possible as well. As a first example, the boundary 664 may be a line rather than a plane. In an illustrative example, the sensor 502 may be positioned at an alternate position 504 depicted in FIG. 12. From this vantage point directly above the inventory holder 530, the sensor 502 may view an area of uniform and relatively short distance (corresponding to the top of the inventory holder 630) bounded by a line at which the distance suddenly increases dramatically (corresponding to the edge at which the floor becomes visible). Protruding objects may be identified based on any portions of the view that are adjacent to the line and have a distance that does not correspond to a distance to the floor (which may be set based on the known height of the sensor 502 or calculated according to the majority of datapoints on the side of the line opposite the inventory holder 630). However, such an arrangement using a line instead of a plane as a boundary 664 may be less accurate in detecting protruding items 540 if the inventory holder 530 is vertically tilted due to its loading or other factors.

As a second example, the boundary 664 may be a contoured three-dimensional surface that more closely conforms to openings in the front face 532 of the inventory holder 530. An analysis of whether a detected object falls in front or behind the surface could be performed on an individual datapoint basis. However, such an approach may be more calculation-intensive without a corresponding improvement in functionality.

As a third example, a process of identifying protruding objects 640 may be performed without calculating a boundary 664 based on the particular inventory holder 630 positioned within the receiving zone 654. For example, a nominal face approximation of the front face 632 of the inventory holder 630 may be used as a boundary 664 without reference to data from the sensor 502. However, such an arrangement may be less accurate due to not accounting for possible minor variations in placement of inventory holders 630 within the receiving zone 654 by mobile drive units (e.g., 520).

In some embodiments, the overhang module 515 may utilize additional data (such as from a subsequent scan from the sensor 502 or from another sensor) to verify or double check that an object is actually overhanging before alerting the operator. In some embodiments, the overhang module 515 may automatically and/or constantly analyze fresh data from the sensor 502 to determine whether to provide an alert or a subsequent alert to the operator. In other embodiments, the overhang module 515 may wait to analyze further data until the operator has provided input (such as a button press) indicating that the overhang condition has been resolved. In some embodiments, the overhang module 515 may release an inventory holder 630 from the receiving zone 654 in response to input from an operator indicating that the overhang condition has been resolved even though the overhang module 515 is indicating that the overhang condition persists.

Figure 18:
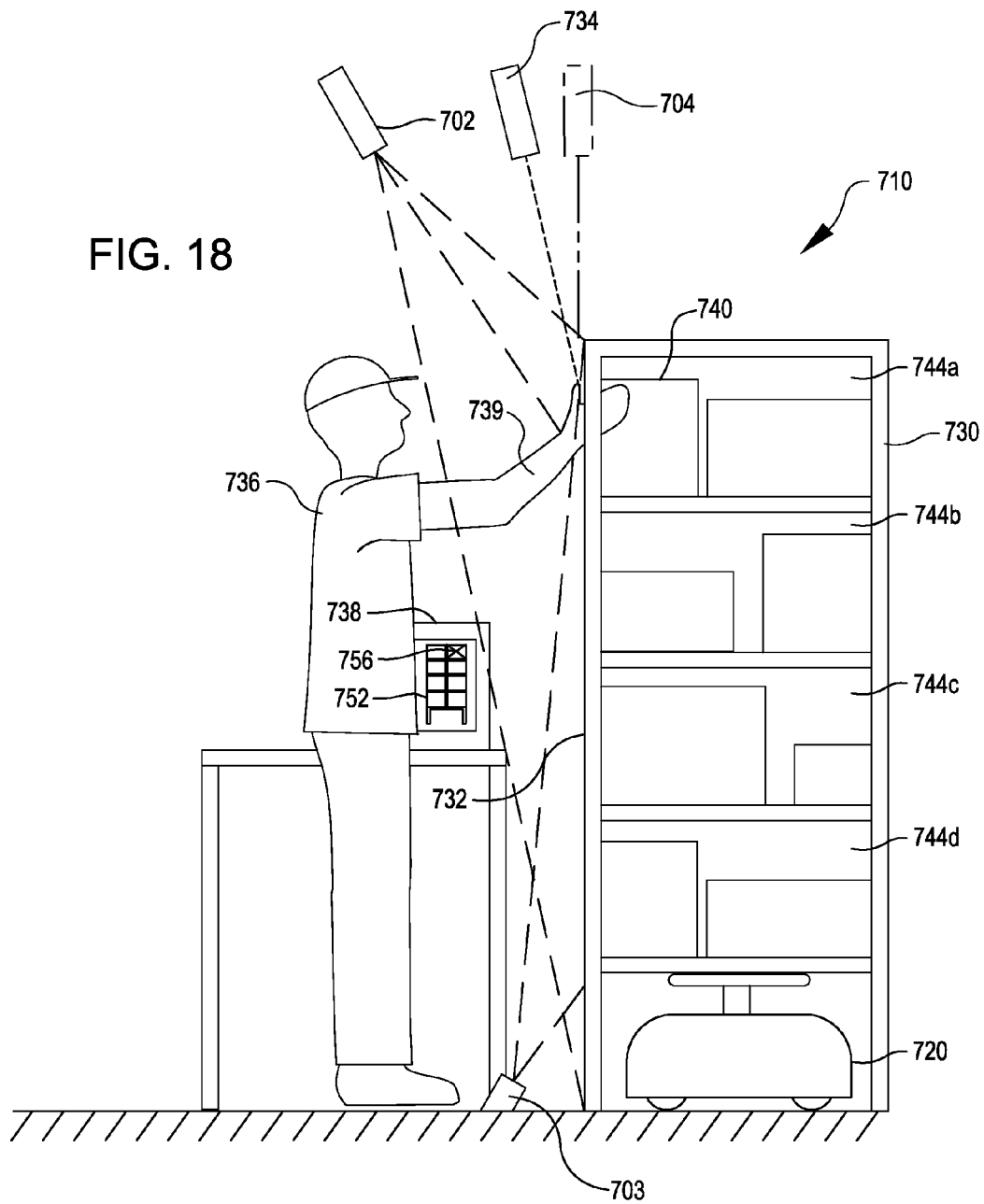
FIG. 18 illustrates a side view of another example of a sensor and an inventory holder in accordance with embodiments.

FIG. 18 illustrates an inventory system 710 with a sensor 702 positioned for detecting an arm position of an operator 736 relative to an inventory holder 730 according to some embodiments. The detected position of an arm 739 of the operator 736 can indicate a particular bin 744a-744d on the inventory holder 740, such as which bin an inventory item 740 is placed in by an operator 736. That is, by determining a position of an arm 739 of the operator 736, an assumption can be made that the operator 736 placed an item in, or removed an item from, a particular bin. The inventory system 710 can detect the position of the arm 739 of the operator 736 at a time of interest. The time of interest may be indicated by a gesture performed by the operator 736. For example, a gesture may include the operator's arm 739 passing across the front face 732 of the inventory holder 730. The location of the front face 732 may be determined in a manner similar to that described above with respect to FIGS. 12-17. As another example, the gesture may be an interaction with the inventory holder such as a hand signal or motion that can be recognized by the inventory system 710. This hand signal can occur just before removing an item from a bin, for example.

The inventory system 710 may include a display 738 with a representation or caricature 752 showing a location 756 identified by the inventory system 710. Such an arrangement may provide an opportunity for the operator 736 to confirm that the system has detected the correct position for bin 744a-d on the inventory holder 730. Alternatively, the inventory system 710 may instead or additionally point a laser pointer 734 at the detected position. The sensor 702 may be positioned above a space that is expected to be occupied by an inventory holder 730 when brought by a mobile drive unit 720. In some arrangements, the sensor 702 can even be arranged at an alternate position 704 directly overhead a front face 732 of the inventory holder 730. In some embodiments, an additional sensor 703 is provided at a different orientation and/or position from the sensor 702, such as below the inventory holder 730 so as to provide additional information about the position of the arm 739 if the operator 736 is bending over and obstructing the view of the arm 739 from the sensor 702. Other arrangements are also possible, including positioning the sensor 502 and/or 503 at other locations relative to the inventory holder 730 (e.g., below, beside, in front, off to a side, or on the inventory holder 730) or mounting the sensor 702 on an operator 736 or other movable frame of reference.

Figure 19:
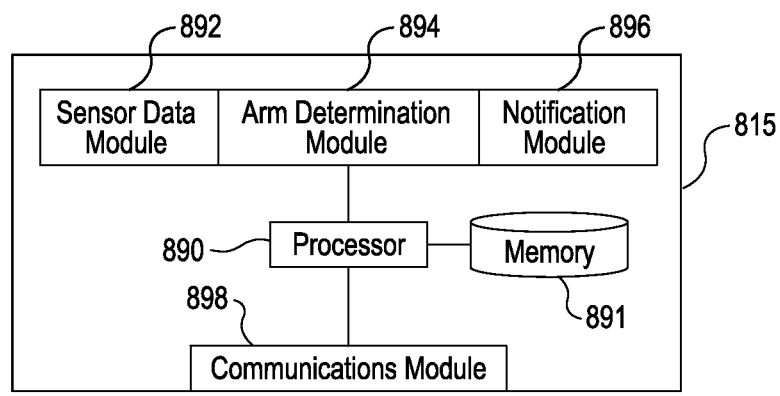
FIG. 19 illustrates an example module that may be utilized in particular embodiments of the inventory system shown in FIG. 18.

FIG. 19 illustrates a bin identification module 815 that can be used to provide functions described with respect to FIG. 18 and/or elsewhere herein. The module 815 can include a processor 890, memory 891, sensor data module 892, arm determination module 894, notification module 896, and communications module 898.

Although the bin identification module 815 is described herein with respect to components depicted in FIG. 18, the features of the bin identification module 815 can also be used with other systems and components described herein. The sensor data module 892 can receive and process data from the sensor 702 and/or sensor 703 and/or any additional sensors utilized in the inventory system 710. For example, the sensor data module 892 can convert data from the sensor 702 into spatial data regarding the spatial position of objects detected by the sensor 702. Arm determination module 894 can be used to recognize data corresponding to an arm 739 of an operator 736. For example, the arm determination module 894 can determine a spatial position of the arm 739, what datapoints correspond to the arm 739, and/or what gesture the arm 739 is making The arm determination module 894 may also determine what bin on an inventory holder 730 most nearly represents or correlates to the position of the arm 739 of the operator 736. Notification module 896 can notify other components of the system and/or the operator 736 about the bin identification made based on the position of the arm 739 of the operator 736. For example, the notification module 896 may communicate with the inventory module 97 described with respect to FIG. 2 in order to indicate a position on an inventory holder 730 of an inventory item 740. Communications module 898 may facilitate this communication and other communications between modules and system components described herein.

Figure 20:
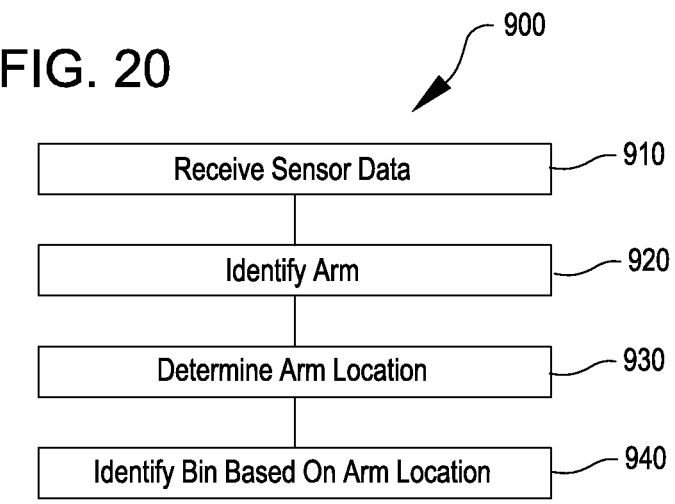
FIG. 20 is a flowchart representative process that can be executed by a system to correlate arm placement of an operator with information about an inventory holder in accordance with embodiments.

FIG. 20 is a flowchart illustrating a process 900 that can be executed by the bin identification module 815 or other systems described herein. At operation 910, the sensor data module 892 can receive data from a sensor such as sensor 702 depicted in FIG. 18. At operation 920, the arm determination module 894 can identify an arm 739 of the operator 736. This may include identifying a grouping of datapoints that corresponds to a stored expected arm shape or profile. At operation 930, the arm determination module 894 can determine a location of the arm 739. For example, the arm location may include a height off of the ground and a lateral distance from a center of the inventory holder 730. At operation 940, a bin can be identified on the inventory holder 740 based on the determined arm location. For example, the location of the arm 739 can be compared to a bin geometry (e.g., which may indicate bin positions for a particular inventory holder and be stored in memory 891 and/or determined based on data from the sensor 702) to determine a bin to associate with the position of the arm 739. This bin identification may be compared with a known location of an item to verify that the operator 736 placed an item in or pulled an item from the correct bin, for example.

Figure 21:
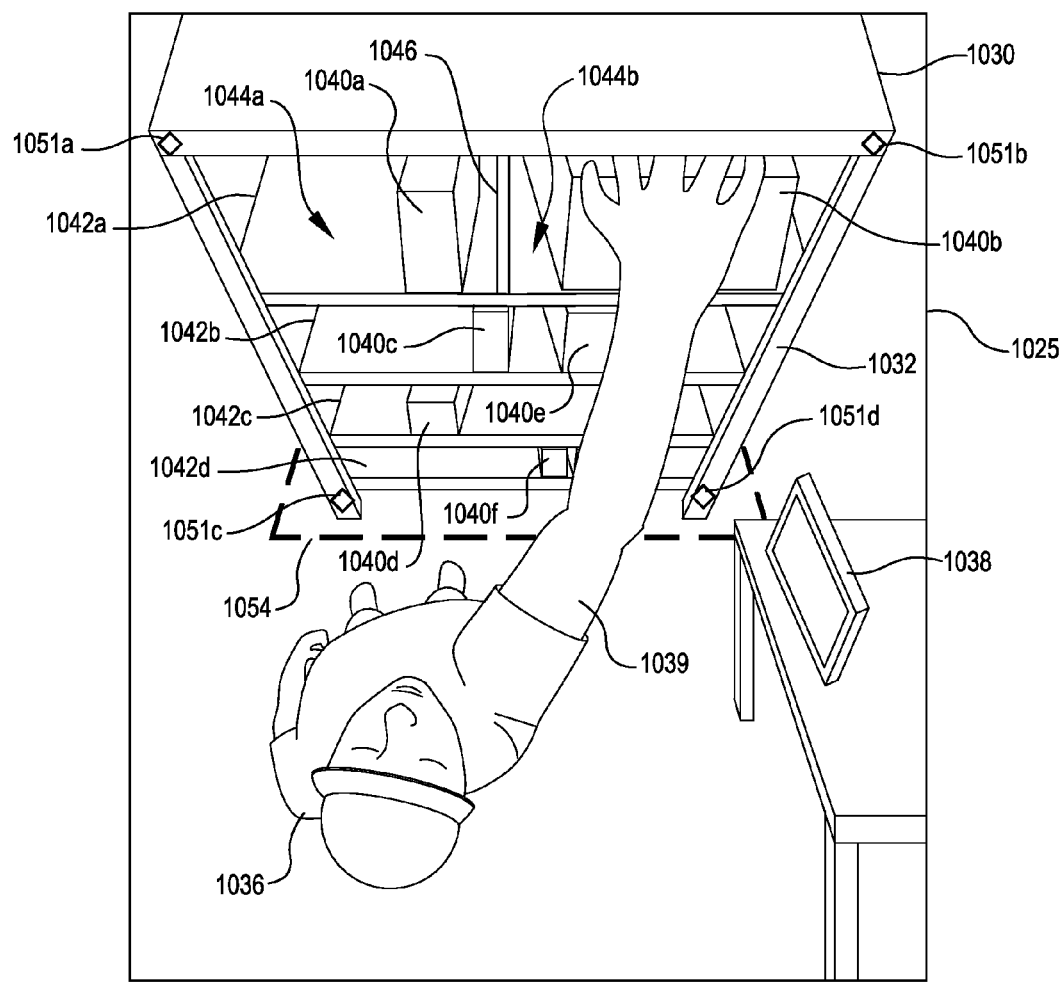
FIG. 21 is an example of a view of an inventory holder from a sensor in accordance with embodiments.
Figure 22:
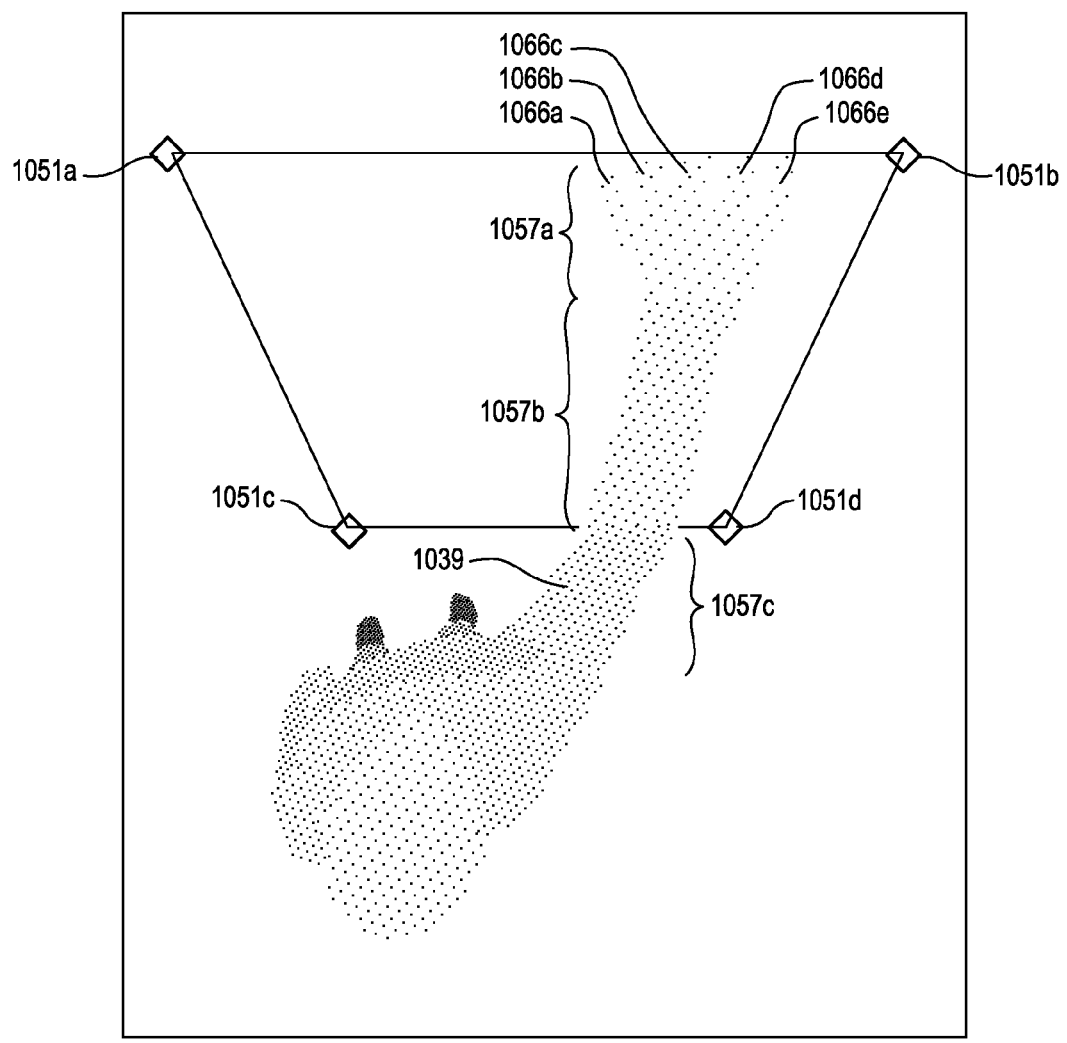
FIG. 22 is an example of a three-dimensional representation of the view depicted in FIG. 21 in accordance with embodiments.

Operation of the inventory system 710 or features thereof may be more fully appreciated with reference to examples described in FIGS. 21-22. FIG. 21 illustrates a view 1025 from a sensor 702 in accordance with an embodiment. The view 1025 includes a receiving zone 1054 with an inventory holder 1030 positioned therein. The inventory holder 1030 can include a number of shelves 1042*a-d,* which may be divided into bins such as bins 1044*a* and 1044*b* on shelf 1042*a* divided by divider 1046. An operator 1036 may be tasked with finding a place for inventory items such as inventory items 1040*a-f* on the inventory holder 1030. The position of the operator's arm 1039 may be captured in the view 1025. The inventory holder 1030 may include a number of fiducial marks 1051*a*-1051*d* for improved detection of geometry of the inventory holder 1030. The view 1025 may also include other objects associated with the station and/or receiving zone 1054, such as the display 1038.

FIG. 22 illustrates height data derived from the view 1025 from the sensor 702. For example, the sensor 702 can provide a number of datapoints each representing a distance from the sensor 702. The position of the sensor 702 relative to a floor, along with the distance information, can be used to calculate a height off the floor of each datapoint. Relative position of the datapoints within the view 1025 can be used to calculate lateral position relative to the floor, such as in left-right and forward-back directions.

The inventory system 710 can determine regions 1057*a-c* associated with an arm 1039 of an operator 1036. In one illustrative example, the inventory system 710 may utilize a profile or expected shape of an arm 1039 to determine which datapoints should be associated with the arm 1039. In another illustrative example, the depth information from the sensor 702 may be associated with color information, which may be used to detect the arm 1039, such as by filtering for the datapoints that correspond to a glove or skin color. The arm 1039 may include different regions 1057*a-c* corresponding to different heights of the arm 1039, which can also assist in determining the orientation of the arm 1039.

A subset of datapoints corresponding to a relevant portion of the arm 1039, such as the hand or a portion nearest the front face 1032 of the inventory holder 1030, can be determined. The location of the front face 1032 of the inventory holder 1030 may be associated with a plane or other boundary 1064 determined using the fiducial marks 1051*a-d* as described above or by any other suitable method. A selected height out of the subset can be utilized to approximate the height of the relevant portion of the arm 1039 at the point where the front face 1032 of the inventory holder 1030 is crossed. For example, the selected height may be the greatest height out of the subset, a lowest height out of the subset, a weighted or un-weighted average of the heights of the subset, or any other suitable height derived from heights of the subset of points. The lateral position of one or more datapoints corresponding to that selected height can also be used in determining the position of the relevant portion of the arm 1039. The lateral position and height of the relevant portion of the arm 1039 can be compared against an arrangement of the inventory holder 1030 to estimate where the relevant portion of the arm 1039 was, relative to the inventory holder 1030.

The inventory system 710 may use any gesture in order to determine when to measure the height and lateral position of the relevant portion of the arm 1039 of the operator 1036. For example, instead of determining the spatial position of the relevant portion of the arm 1039 upon passage through the plane or boundary 664, the system may use a gesture of detecting spread apart fingers (such as the five spread fingers 1066A-E depicted in FIG. 22) as the event prompting the system to determine the location of the relevant portion of the arm 1039.

The inventory system 710 may also use a variety of gestures to indicate different conditions. In some embodiments, a preliminary gesture indicates a bin location and a subsequent gesture confirms, negates, or otherwise indicates a significance of the bin. In some embodiments, a gesture may confirm or negate another gesture or condition. The inventory system 710 may generate instructions based on the identified gesture. Various such gestures and instructions can be understood with reference to the following illustrative example.

In an illustrative example, an operator 1036 is tasked with finding space for an item 1040*b* on the inventory holder 1030. The operator 1036 scans a barcode for (or otherwise indicates the identity of) the item 1040*b*. The operator 1036 initially tries to store the item 1040*b* in bin 1044*a,* at which point the inventory system 710 recognizes a first gesture (i.e., the arm 1039 of the operator 1036 passing through a plane boundary 1064 associated with the front face 1032 of the inventory holder 1030). The inventory system 710 determines the spatial position of the arm 1039 during the first gesture, identifies the bin 1044*a* as corresponding to that spatial position (e.g., based on the height and lateral position of the bin 1044*a* stored in the inventory system 710), and generates an instruction to associate the first gesture with the bin 1044*a*. The operator 1036 however decides that the item 1040*b* will not fit alongside the item 1040*a* already in the bin 1044*a,* and the operator 1036 instead places the item 1040*b* into the adjacent bin 1044*b*. The inventory system 710 recognizes a second gesture (i.e., the arm 1039 again passing the plane boundary 1064, but this time proximate to bin 1044*b*), and associates the second gesture with the location of the adjacent bin 1044*b*. To confirm the placement of the item 1044*b,* the operator 1036 makes a third gesture (i.e., spreading out five fingers along the front and/or the top of the item 1044*b* such that the spread fingers are within view of the sensor 702), which the inventory system 710 recognizes and interprets as an instruction to associate the item 1044*b* with the last bin identified (i.e., bin 1044*b* identified by the second gesture).

The operator 1036 next scans a barcode for a large item and, while looking for a place to put the large item on the inventory holder 1030, notices that the attempt to stow the previous item 1040b in the bin 1044a has caused the item 1040a to protrude from the bin 1044a. As the operator 1036 reaches up to push the item 1040a back into the bin 1044a, the inventory system 710 recognizes a fourth gesture (i.e., passing the plane) and associates the fourth gesture with the bin 1044a. The operator 1036 performs a fifth gesture (e.g., pointing an index finger at the bin 1044a) to communicate to the inventory system 710 that the previous (fourth) gesture was associated with an item already in the bin 1044a and not the scanned large item. After deciding that the large item simply will not fit on the inventory holder 1030, the operator 1036 performs a sixth gesture (e.g., moving a fist in a large circle in front of the inventory holder 1030) to communicate to the inventory system 710 that the large item has not been stowed on the inventory holder 1030 and/or a that new inventory holder should be brought for the large item.

As may be appreciated, a library of gestures can be compiled in which each gesture indicates a particular meaning A non-exhaustive list of gestures may include passing a plane with an object (such as an item or arm), holding fingers in various arrangements (such as spread fingers, extending a number of fingers, or clenching fingers in a fist), pausing with an arm in a certain position (such as resting on bin or item located therein), and arm motions (such as waving up and down, side to side, or in other recognizable patterns). A non-exhaustive list of meanings may include bin location, item stored, item not stored, item protrusion, condition remedied, empty bin, location of removed item, damaged inventory, insufficient space to stow inventory, and missing inventory. Multiple meanings may also be associated with a particular gesture. As an illustrative example, a pointing gesture may mean both a bin location and a condition of the bin.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A method comprising operations performed under the control of one or more computer systems configured with executable instructions, the operations comprising:
   receiving, at the one or more computer systems, distance information from a sensor, the distance information including information about distances between the sensor and portions of objects, the objects including a mobile inventory holder and items supported by the mobile inventory holder;
   determining, based at least in part on the distance information, a plane corresponding to a face of the mobile inventory holder;
   determining, based at least in part on the distance information, that one or more protruding items are protruding from the mobile inventory holder and at least partially through the plane corresponding to the face of the mobile inventory holder;
   generating protruding information, the protruding information including information about the determined one or more protruding items; and
   sending a signal based at least in part on the protruding information, the signal corresponding to at least one of:
      a signal configured to cause a representation of the mobile inventory holder to be shown on a display for facilitating handling of a protruding condition by a human operator, the representation showing a position of a protruding item relative to the mobile inventory holder;
      a signal configured to cause a laser pointer to point to a location on the mobile inventory holder for facilitating handling of a protruding condition by a human operator, the location corresponding to a position of a protruding item relative to the mobile inventory holder; or
      a signal configured to prevent movement of the mobile inventory holder in the presence of a protruding condition.

2. The method of claim 1, wherein the determining the plane corresponding to the face of the mobile inventory holder comprises determining the plane based at least in part on distance information corresponding to fiducial marks located on the face of the mobile inventory holder.

3. The method of claim 1, wherein the generating comprises generating information about at least one of a size or position of the determined one or more protruding items.

4. The method of claim 1, further comprising:
sending, based at least in part on a received indication that the protruding condition has been resolved, instructions to allow movement of the mobile inventory holder.

5. The method of claim 1, further comprising eliminating distance information corresponding to objects located outside of a volume of interest, the volume of interest based at least in part on an expected location of the mobile inventory holder and including at least a portion of the plane corresponding to the face of the mobile inventory holder.

6. The method of claim 5, wherein the determining the plane corresponding to the face of the mobile inventory holder comprises determining the plane based at least in part on distance information corresponding to objects located within the volume of interest, and creating a plane fit for the plane corresponding to the face of the mobile inventory holder.

7. A non-transitory computer-readable storage medium having stored therein instructions that, when executed by one or more processors of a computer system, cause the computer system to at least:
receive data from a sensor, the data including information about a spatial position of a mobile inventory holder and one or more items stored in the mobile inventory holder;
determine a boundary corresponding to at least a part of a face of the mobile inventory holder;
determine, based at least in part on the data from the sensor, that an item stored in the mobile inventory holder is projecting across the boundary; and
send a signal based at least in part on determining that the item stored in the mobile inventory holder is projecting across the boundary.

8. The non-transitory computer-readable storage medium of claim 7, wherein determining the boundary corresponding to at least the part of the face of the mobile inventory holder comprises determining a boundary that is at least one of an edge, a line, a plane, or a three-dimensional contoured surface.

9. The non-transitory computer-readable storage medium of claim 7, wherein determining the boundary corresponding to at least the part of the face of the mobile inventory holder comprises determining a boundary that is spaced apart from the face of the mobile inventory holder.

10. The non-transitory computer-readable storage medium of claim 7, wherein determining the boundary corresponding to at least the part of the face of the mobile inventory holder comprises selecting a boundary positioned at an expected position of the face of the mobile inventory holder.

11. The non-transitory computer-readable storage medium of claim 7, wherein the instructions further cause the computer system to at least display or present information about a location of the item that is projecting across the boundary.

12. The non-transitory computer-readable storage medium of claim 7, wherein the signal corresponds to at least one of:
a signal configured to cause a representation of the mobile inventory holder to be shown on a display for facilitating handling of a protruding condition by a human operator, the representation showing a position relative to the mobile inventory holder of the item determined to be projecting across the boundary;
a signal configured to cause a laser pointer to point to a location on the mobile inventory holder for facilitating handling of a protruding condition by a human operator, the location corresponding to a position relative to the mobile inventory holder of the item determined to be projecting across the boundary; or
a signal configured to prevent movement of the mobile inventory holder in the presence of a protruding condition.

13. An inventory management system comprising:
a mobile inventory holder;
a station comprising:
a receiving zone configured to receive the mobile inventory holder;
a sensor aimed at the receiving zone; and
one or more processors configured to:
receive data from the sensor about objects in the receiving zone;
determine, based at least in part on the data, a spatial representation of datapoints in which each datapoint has a value indicative of a spatial position of an associated object detected by the sensor;
fit a surface based at least in part on the spatial representation, the surface corresponding to a face of the mobile inventory holder positioned in the receiving zone;
determine datapoints of at least one object protruding from the mobile inventory holder and having a spatial position that at least partially extends through the surface corresponding to the face of the mobile inventory holder; and
send a signal based at least in part on the datapoints determined of the at least one object protruding from the mobile inventory holder and having a spatial position that at least partially extends through the surface corresponding to the face of the mobile inventory holder.

14. The inventory management system of claim 13, further comprising a display, wherein the signal is configured to cause a representation of the mobile inventory holder to be shown on the display, the representation showing a position relative to the mobile inventory holder of the at least one protruding object associated with the datapoints determined as having the spatial position that at least partially extends through the surface corresponding to the face of the mobile inventory holder.

15. The inventory management system of claim 13, further comprising a laser pointer, wherein the signal is configured to cause the laser pointer to point to a position on the mobile inventory holder, the position associated with the datapoints determined as having the spatial position that at least partially extends through the surface corresponding to the face of the mobile inventory holder.

16. The inventory management system of claim 13, wherein the one or more processors are further configured to:
determine clusters of datapoints having the spatial position that at least partially extends through the surface corresponding to the face of the mobile inventory holder;
compare the clusters to a size threshold; and
provide information about a location of items associated with any clusters exceeding the size threshold.

17. The inventory management system of claim 16, wherein the one or more processors are further configured to provide information about a size of the items associated with the clusters exceeding the size threshold.

18. The inventory management system of claim 13, further comprising a mobile drive unit configured to move the mobile inventory holder relative to the receiving zone in response to instructions from the one or more processors, wherein the one or more processors are further configured to trigger an overhanging item condition indicator when datapoints having the spatial position that at least partially extends through the surface corresponding to the face of the mobile inventory holder are determined and to not trigger the overhanging item condition indicator when datapoints having the spatial position that at least partially extends through the surface corresponding to the face of the mobile inventory holder are not determined, wherein the one or more processors are further configured to refrain from sending instructions to the mobile drive unit to move the mobile inventory holder when the overhang item condition indicator is triggered.

19. The inventory management system of claim 18, wherein the one or more processors are further configured to remove the overhanging item condition indicator when no datapoints having the spatial position that at least partially extends through the surface corresponding to the face of the mobile inventory holder are determined.

20. The inventory management system of claim 18, further comprising an operator interface, wherein the one or more processors are further configured to remove the overhanging item condition indicator in response to an input from the operator interface.

* * * * *